United States Patent
Falempin et al.

(10) Patent No.: US 9,556,794 B2
(45) Date of Patent: Jan. 31, 2017

(54) TURBINE ENGINE INCLUDING A CONTINUOUS WAVE DETONATION CHAMBER AND COOLING BYPASS FLOW AND AIRCRAFT PROVIDED WITH SUCH A TURBINE ENGINE

(75) Inventors: François Falempin, Saint Amoult (FR); Bruno Le Naour, Bourges (FR)

(73) Assignee: MBDA FRANCE, Paris (FR)

( * ) Notice: Subject to any disclaimer, the term of this patent is extended or adjusted under 35 U.S.C. 154(b) by 234 days.

(21) Appl. No.: 14/116,001

(22) PCT Filed: May 9, 2012

(86) PCT No.: PCT/FR2012/000186
§ 371 (c)(1),
(2), (4) Date: Mar. 17, 2014

(87) PCT Pub. No.: WO2012/156597
PCT Pub. Date: Nov. 22, 2012

(65) Prior Publication Data
US 2014/0245714 A1 Sep. 4, 2014

(30) Foreign Application Priority Data
May 16, 2011 (FR) ...................................... 11 01483

(51) Int. Cl.
*F02C 5/02* (2006.01)
*F02C 7/22* (2006.01)
(Continued)

(52) U.S. Cl.
CPC . *F02C 7/22* (2013.01); *F02C 3/14* (2013.01); *F02C 5/02* (2013.01); *F02K 7/08* (2013.01);
(Continued)

(58) Field of Classification Search
CPC ................. F02C 5/00; F02C 5/02; F02C 5/10; F02C 5/11; F02C 5/12; F23R 7/00; F23R 7/50
See application file for complete search history.

(56) References Cited

U.S. PATENT DOCUMENTS

| | | | | |
|---|---|---|---|---|
| 5,392,614 A | * | 2/1995 | Coffinberry | F02C 7/12 60/806 |
| 6,442,930 B1 | * | 9/2002 | Johnson | F02K 7/06 60/226.1 |

(Continued)

FOREIGN PATENT DOCUMENTS

| | | | | |
|---|---|---|---|---|
| GB | 1069217 | | 5/1967 | |
| GB | 1069217 A | * | 5/1967 | ................ F02C 5/10 |

*Primary Examiner* — Phutthiwat Wongwian
*Assistant Examiner* — Marc Amar
(74) *Attorney, Agent, or Firm* — Duane Morris LLP; J. Rodman Steele, Jr.; Gregory M. Lefkowitz

(57) ABSTRACT

The chamber (4) of the turbine engine (1) comprises a continuous detonation wave engine (6) provided with an annular detonation chamber (7) and associated means (8, 9) that can be used to generate a continuous production of hot gases from a detonation mixture of fuel and air. The continuous detonation wave engine (6) is arranged such as to form, from a flow of incoming air (E), a first flow (F1) which enters the detonation chamber (7) and which is used by the engine (6) and a second flow (F2) which bypasses the chamber. The turbine engine (1) also includes auxiliary means (10) for mixing the hot gases (F3) leaving the detonation chamber (7) with the second flow of air (F2) before directing same towards the turbine (5). A plurality of detonation chambers (7) are arranged concentrically to one another relative to the axis of the turbine engine.

11 Claims, 2 Drawing Sheets

Figure 1:
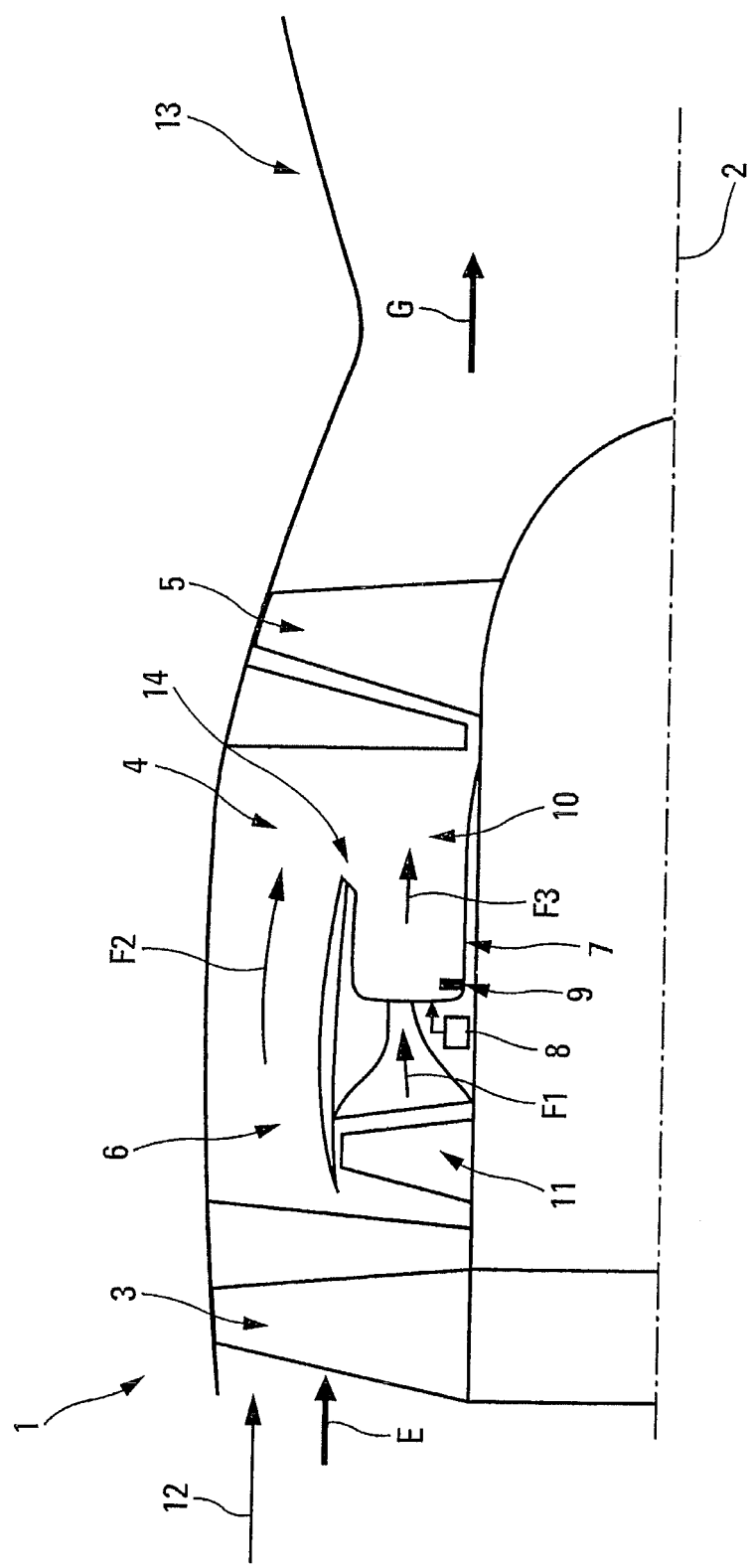

(51) Int. Cl.
*F02C 3/14* (2006.01)
*F02K 7/08* (2006.01)
*F23R 3/50* (2006.01)
*F23R 7/00* (2006.01)

(52) U.S. Cl.
CPC . *F23R 3/50* (2013.01); *F23R 7/00* (2013.01); Y02T 50/671 (2013.01)

(56) References Cited

U.S. PATENT DOCUMENTS

| | | | |
|---|---|---|---|
| 6,666,018 B2* | 12/2003 | Butler | F02K 3/075 60/226.1 |
| 7,124,573 B2* | 10/2006 | Venkataramani | F02K 7/02 60/247 |
| 7,886,866 B2* | 2/2011 | Fullerton | F02K 7/02 102/355 |
| 8,082,728 B2 | 12/2011 | Murrow | |
| 8,544,280 B2 | 10/2013 | Lu | |
| 2007/0180810 A1* | 8/2007 | Chapin | F01D 25/12 60/39.76 |
| 2008/0115480 A1* | 5/2008 | Rasheed | F02C 5/02 60/39.76 |
| 2012/0151895 A1* | 6/2012 | Tangirala | F02C 5/02 60/39.76 |
| 2012/0151898 A1 | 6/2012 | Claflin | |

\* cited by examiner

TURBINE ENGINE INCLUDING A CONTINUOUS WAVE DETONATION CHAMBER AND COOLING BYPASS FLOW AND AIRCRAFT PROVIDED WITH SUCH A TURBINE ENGINE

CROSS-REFERENCE TO RELATED APPLICATIONS

This application is a §371 national stage entry of International Application No. PCT/FR2012/00186, filed May 9, 2012, which claims priority to French Patent Application No. 1101483, filed May 16, 2011, the entire contents of which are incorporated herein by reference.

The present invention relates to a turbomachine comprising a detonation chamber, and to a flying vehicle, in particular an aeroplane, which is fitted with such a turbomachine.

More particularly, the present invention relates to any type of turbomachine, such as a turbojet, a turboprop, a turbo-generator or a gas turbine, which conventionally comprises at least, in the flow direction of the gases, a compressor, a combustion chamber capable of generating a flow of hot gases from an air mixture originating from a captured air flow and from a fuel, and a turbine which is driven in rotation by said flow of hot gases and which drives said compressor.

A turbomachine thus recovers thermal energy from the gases emanating from the combustion carried out in the combustion chamber by means of the turbine, in order to drive the compressor, as well as accessories which are necessary for the smooth operation of the machine (pumps, regulators etc.).

Conventionally, said combustion chamber which is intended to generate a flow of hot gases is, generally, a combustion chamber under constant pressure.

The aim of the present invention is that of perfecting such a turbomachine in order, in particular, to increase the output thereof.

For this purpose, according to the invention, said turbomachine of the type comprising at least, in the flow direction of the gases, a compressor, a chamber comprising means capable of generating hot gases from an air mixture originating from a captured air flow and from a fuel, and a turbine which is driven in rotation by said hot gases and which drives said compressor, is notable in that said chamber comprises a continuous detonation wave engine, fitted with an annular detonation chamber and associated means (injection system, initiation means) making it possible to generate continuous production of hot gases from an explosive fuel and air mixture, in that said continuous detonation wave engine is arranged so as to form, from said captured air flow, a first flow which enters said detonation chamber and which is used by said engine, and a second flow which bypasses said chamber, and in that said turbomachine comprises, in addition, auxiliary means for mixing the hot gases emanating from the detonation chamber with said second air flow before conducting said gases towards the turbine.

Thus, according to the present invention, in a turbomachine (turbojet, turboprop, gas turbine, turbo-generator), the conventional combustion chamber under constant pressure is replaced with an engine of the continuous detonation wave type, described in greater detail below.

In addition, according to the invention, part of the captured fresh air (incoming air) is deflected around the detonation chamber, in order to operate said chamber at concentration levels which are sufficient to ensure stable operation and optimal thermodynamic efficiency. Then, said deflected (or diverted) air is mixed with the hot gases emanating from the detonation chamber so as to limit the temperature of the gases which are to drive the turbine. For this purpose, an ejector/mixing system is preferably provided which allows the gases emanating from the detonation chamber to be diluted and which confers part of the momentum thereof to the diverted fresh air in order to obtain, over a relatively short distance, a gas mixture which has a temperature which is compatible with the behaviour of the turbine.

Conventionally, a continuous detonation wave engine (referred to as a CDWE) comprises an annular chamber in which a continuous production of hot gases emanating from self-sustaining detonation waves is generated. A generator is thus obtained, as for a combustion chamber which is under constant pressure, which generates hot gases which form, after leaving the detonation chamber, a supersonic flow, the features of which are relatively uniform.

By contrast, from the point of view of the thermodynamic cycle, the detonation according to the present invention potentially has an output which is 15 to 25% greater than that of combustion under constant pressure. In addition, with regard to a combustion chamber under constant pressure of the pulsed detonation engine (PDE) type, the problem of the very harsh vibration environment which is generated does not have to be addressed, a priori, by such a pulsed detonation engine. Indeed, in the case of the CDWE, the flow at the output is relatively uniform (but supersonic) and does not generate low frequencies that are very harmful in terms of the noise and the environment to which the rest (equipment, passengers) of the vehicle equipped with the turbomachine is subjected.

The replacement according to the invention of a conventional combustion chamber under constant pressure with a CDWE-type engine fitted with a detonation chamber makes it possible, in particular, to obtain the following advantages, as explained in greater detail below:

due to the decreased need for a compression rate—a priori two to three times less than iso performance—it is possible to simplify and reduce the compressor stages, and thus the turbine stages, and to thereby reduce the development and production costs whilst reducing the mass; and for an equivalent complexity and equivalent performances of the compressor(s) (and thus of the turbine (s)), due to the greater efficiency of the thermodynamic cycle, it is possible to substantially reduce the fuel consumption (15 to 20%) and, thus, the $CO_2$ emissions. It should also be noted that the almost instantaneous release of the hot gases after the detonation wave makes it possible, despite the very high maximum temperatures reached, to produce almost no nitrogen oxides ($NO_x$).

In a particular embodiment, said turbomachine can additionally comprise:

a first additional compressor which is arranged downstream of said compressor so as to compress said second air flow; and/or a second additional compressor which is arranged downstream of said compressor and upstream of said detonation chamber so as to compress said first air flow before it enters said chamber.

This particular embodiment in particular makes it easier to ensure the decoupling between the compressor and the detonation chamber of the turbomachine, in particular to avoid an increase in the detonation waves or compression waves up to the compressor.

In addition, in an advantageous manner, said turbomachine can comprise a plurality of annular detonation chambers, as described above, which are arranged in a concentric manner. This makes it possible to create optimal operating conditions over a wide range of overall concentrations by supplying a greater or smaller number of said concentric chambers with fuel, and to limit the shock at start-up by spreading out the ignition of each chamber over time.

In addition, the turbomachine can, advantageously, comprise at least one circuit for cooling said detonation chamber, in which circuit fuel can circulate before the injection thereof into said chamber. Preferably, said cooling chamber extends along at least one lateral wall of said detonation chamber, over at least part of the length thereof.

Thus, the detonation chamber can be cooled using part or all of the fuel before said fuel is injected into said chamber. This makes it possible to maintain the thermal behaviour of the detonation chamber whilst evaporating at least part of the fuel to be injected during the circulation thereof in said circuit. A direct injection of the pre-evaporated fuel guarantees the initiation and the stability of the detonation of the explosive fuel/air mixture. This also prevents problems linked to the delays in evaporation of the drops of fuel and chemical reaction.

The present invention can be applied to any type of turbomachine: turbojet, turboprop, turbo-generator, gas turbine. In addition, it can be implemented:
in a conventional turbomachine of the single flow type, comprising a single flow. In this case, said continuous detonation wave engine is arranged so as to act on said single flow; or
in a conventional turbomachine of the double flow type, comprising a primary flow and a secondary flow. In this case, said CDWE is arranged so as to act on said primary flow.

The present invention also relates to a flying vehicle, in particular an aeroplane, which is fitted with at least one turbomachine as mentioned above.

The present invention also relates to a power generation system which is installed on the ground, and which is equipped with at least one such turbomachine.

The figures of the appended drawings provide understanding as to how the invention can be produced. FIG. 1 is a schematic, partial cross-sectional view of a turbomachine defined in a general manner, to which the present invention is applied.

Figure 2:
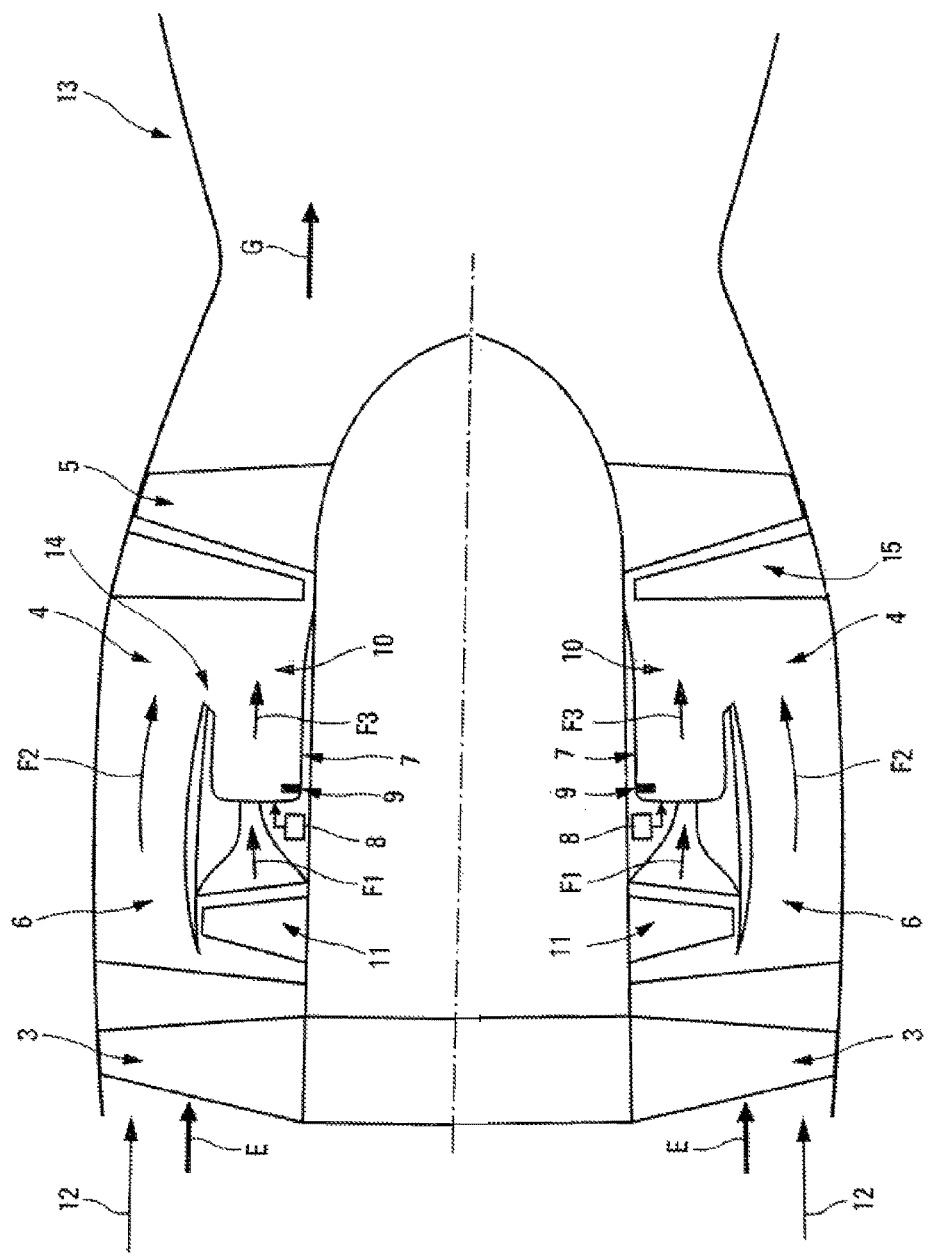

FIG. 2 is a schematic partial cross-sectional view of a turbomachine including a plurality of detonation chambers and an ejector/mixing system.

The turbomachine 1 shown schematically and in part in the figure has an axis 2 and comprises, in a conventional manner, in the flow direction 12 of the gases, downstream of an air inlet (not shown), of which the captured air flow is shown by an arrow E:
one or more conventional compressors 3;
a chamber 4 capable of generating hot gases from an air mixture originating from said captured air flow E and a conventional fuel;
one or more conventional turbines 5 which are driven in rotation by said hot gases and which drive said compressor(s) 3, as well as conventional accessories (not shown) which are necessary for the smooth operation of the turbomachine 1 (pumps, regulators etc.); and
means 13 (nozzle) allowing the gases to escape, as shown by an arrow G.

All these elements which are well known and which can be produced in different ways in a conventional manner are not described in greater detail below. This general presentation makes it possible to show that the present invention can be applied to any type of turbomachine 1 having the preceding general features. Said invention can be applied in particular to a turbojet, a turboprop, a gas turbine, or a turbo-generator.

It should be noted that, in the present description, the concepts of upstream and downstream are defined in relation to the flow direction 12 of the gases.

According to the invention, in order to improve said turbomachine 1:
said chamber 4 is fitted with a continuous detonation wave engine (referred to as a CDWE). Said engine 6 comprises in particular an annular detonation chamber 7 which is arranged in a concentric manner in relation to the axis 2, as well as associated means 8 and 9 (described in greater detail below) which are necessary for the operation of said engine, and is capable of generating continuous production of hot gases from an explosive fuel and air mixture;
said continuous detonation wave engine 6 is arranged in said chamber 4 downstream of said compressor 3 so as to use part of the captured air flow E. More particularly, this arrangement makes it possible to form, from said captured air flow E:
a first air flow F1 which enters said detonation chamber 7 and which is used by said engine 6 to form hot gases (flow F3); and
a second air flow F2 which bypasses said detonation chamber 7; and
said turbomachine 1 comprises, in addition, an ejector/mixing system 10 (not shown specifically) for mixing the hot gases (flow F3) emanating from the detonation chamber 7 with said second air flow F2 before conducting said mixture towards the turbine 5 to drive it.

Thus, the present invention provides the replacement, in a turbomachine 1 (turbojet, turboprop, gas turbine, turbo-generator) of the conventional hot gas generator, that is to say a combustion chamber under constant pressure, with a continuous detonation wave engine (CDWE) 6.

Conventionally, such a CDWE 6 comprises an annular chamber 7 in which a continuous production of hot gases emanating from self-sustaining detonation waves is generated. In such an engine 6, an injection system 8 injects fuel in a continuous manner into the annular chamber 7. Said fuel mixes with the cool air of said flow F1 to form an explosive mixture. A detonation wave is then initiated in said explosive mixture by means of conventional initiation means 9 (exploding bridge wire, pre-detonation tube etc.). Said wave propagates in a circumferential manner in the cool explosive mixture, whilst the hot gases that said wave produces expand into the rest of the annular chamber 7. Since the injection of the cool explosive mixture is continuous, when the wave returns to its starting point, it comes back into contact with the cool mixture and continues the circumferential movement thereof, which thus becomes continuous. In fact, downstream of the detonation wave, and after the initial release of the hot gases, a layer of cool mixture develops which, because it is in contact with the hot gases and under certain conditions, gives rise to a new, self-initiated detonation wave. An annular chamber 7 is thus obtained, in which a series of circumferential detonation waves travelling at the frequency of several kHz (up to 30 kHz) produces hot gases which expand towards the open, downstream end 14 of the chamber 7.

Thus, according to the invention, part F1 of the captured cool air E is used so as to operate the engine 6 at levels of concentration which are sufficient to ensure stable operation and optimal thermodynamic efficiency.

In addition, the ejector/mixing system 10, 15 mixes the hot gases F3 emanating from the detonation chamber 7 with said second (cold air) flow F2 so as to limit the temperature of the gases (mixture F2 and F3) which are to drive the turbine 5. Said ejector/mixing system 10, 15 is formed so as to allow the hot gases F3 emanating from the detonation chamber 7 to be diluted and to confer part of the momentum thereof to the diverted cool air F2 so as to obtain, over a relatively short distance, a gas mixture which has a temperature which is compatible with the behaviour of the turbine 5. Thus, it is possible to operate the detonation chamber 7 at a concentration which is sufficient for obtaining stable and efficient operation (with conditions close to the Chapman-Jouguet conditions), whilst maintaining a temperature at the inlet of the turbine 5 which is sufficiently low to ensure the thermal behaviour thereof.

Due to all the preceding features, as for a combustion chamber under constant pressure, a continuous generation of hot gases is thus obtained, which gases form, after leaving the detonation chamber 7, a supersonic flow, the features of which are relatively uniform.

By contrast, from the point of view of the thermodynamic cycle, the detonation implemented by the engine 6 potentially has an output which is 15 to 25% greater than that of combustion under constant pressure.

The replacement according to the invention of a conventional combustion chamber under constant pressure with a CDWE 6 fitted with a detonation chamber 7 makes it possible in particular to obtain the following advantages:

due to the decreased need for a compression rate—a priori two to three times less than iso performance—it is possible to simplify and reduce the compressor 3 stages, and thus the turbine 5 stages, and to thereby reduce the development and production costs of the turbomachine 1 whilst reducing the mass thereof; and for an equivalent complexity and equivalent performances of the compressor(s) 3 (and thus of the turbine(s) 5), due to the greater efficiency of the thermodynamic cycle, it is possible to substantially reduce the fuel consumption (15 to 20%) and, thus, the $CO_2$ emissions. It should also be noted that the almost instantaneous release of the hot gases after the detonation wave makes it possible, despite the very high maximum temperatures reached, to produce almost no nitrogen oxides ($NO_x$).

In addition, the injection system 8 injects the conventional fuel separately to the air (flow F1). Therefore, no premixture injection is provided, which makes it possible to avoid any risk of combustion upstream of the detonation chamber 7. In addition, in the case of a storable fuel such as a liquid hydrocarbon, it is also possible to provide a regenerative circuit (not shown) which makes it possible to pre-evaporate the fuel (before the injection thereof) and to thus obtain satisfactory mixing and detonation conditions without premixing. Preferably, said regenerative (or cooling) circuit, in which fuel circulates, extends along at least one lateral wall of said detonation chamber, over at least part of the length thereof.

In addition, it is also possible to provide an air injection system (which is produced for example in the form of an annular slot forming an air supply channel) at the inlet to the detonation chamber 7, which makes it possible to produce decoupling between said chamber 7 and the upstream portion.

In a particular embodiment, said turbomachine 1 additionally comprises at least one additional compressor 11 (or booster) which is arranged downstream of said compressor 3 and upstream of said detonation chamber 7 (in the flow direction 12) so as to compress said air flow F1 before it enters said chamber.

This particular embodiment, in particular, makes it easier to ensure decoupling between the compressor 3 and the detonation chamber 7, in particular to avoid an increase in the detonation waves or compression waves up to the compressor 3.

Furthermore, said turbomachine 1 can comprise, additionally, at least one other booster or additional compressor (not shown) which is arranged so as to act on said air flow F2 bypassing the detonation chamber 7.

In addition, in another embodiment shown in FIG. 2, said turbomachine 1 can comprise a plurlaity of (two or more) engines (as described above) and thus a plurality of detonation chambers 7 which are arranged in a concentric manner in relation to each other, relative to the axis 2.

create optimal operating conditions over a wide range of concentrations. Indeed, for a given detonation chamber 7, it is possible to achieve very good performances in a limited region of injected concentration (wave velocity very close to the Chapman-Jouguet velocity in the conditions taken into consideration), but in general having reduced performances for other concentrations. Also, by providing a plurality of concentric detonation chambers 7, potentially having different features, it is possible to obtain good performances over a wide range of overall concentrations by supplying a greater or smaller number of said concentric chambers 7 with fuel; and limit the shock at start-up by spreading out the ignition of each chamber 7 over time.

The present invention can be applied to any type of turbomachine 1. Thus, said invention can be applied, as shown in the figure, to a turbomachine 1 of the single flow type, comprising a single air flow E. In this case, said engine 6 and thus said detonation chamber 7 are arranged so as to act on said single flow E, as described above.

The present invention can also be applied to a conventional turbomachine of the double flow type, comprising a primary flow and a secondary flow. In such a turbomachine, the pre-compressed air does not all pass through the engine, but part (cold flow or primary flow) bypasses via the periphery thereof up to the nozzle where it is ejected with the hot gases (hot flow or primary flow). In such an application, said engine 6 and thus said detonation chamber 7 are arranged so as to act solely on said primary flow.

The invention claimed is:

1. A turbomachine comprising:
a compressor (3) configured to generate a compressed air flow from an incoming air flow (E);
a chamber (4), in which a first portion of said compressed air flow flows through at least one additional compressor (11) to form a first compressed air flow (F1), and a remainder of said compressed air flow forms a second compressed air flow (F2) that flows around said at least one additional compressor, said chamber (4) comprising a continuous detonation wave engine (6), fitted with at least one annular detonation chamber (7) and associated means (8, 9) to generate continuous production of hot gases from an explosive mixture of a fuel and-said first compressed air flow, wherein said fuel is injected into said at least one annular detonation chamber independent of said first compressed air flow;

auxiliary means (10) for mixing the hot gases (f3) emanating from said at least one annular detonation chamber (7) with said second compressed air flow (F2) to generate a mixed gas flow;

at least one additional annular detonation chamber (7) arranged in a concentric manner in relation to at least one annular detonation chamber, and in relation to a central axis (2) of the turbomachine (1); and a turbine (5) driven in rotation by said mixed gas flow, and wherein said turbine drives said compressor (3).

2. The turbomachine according to claim 1, wherein said auxiliary means (10) comprise an ejector/mixing system which allows the hot gases (F3) to be diluted and part of the momentum thereof to be returned air of said second compressed air flow (F2) in order to obtain a gas mixture which has a temperature which is compatible with the behavior of the turbine (5).

3. The turbomachine according to claim 1 wherein said at least one additional compressor (11) is arranged downstream of said compressor (3) and upstream of said at least one annular detonation chamber (7) so as to further compress said first compressed air flow (F1) before it enters said at least one annular detonation chamber.

4. The turbomachine according to claim 1 wherein said turbomachine comprises at least one additional compressor which s arranged downstream of said compressor (3) so as to further compress said second compressed air flow (F2).

5. The turbomachie according to claim 1 wherein said turbomachine comprises at least one circuit for cooling said at least one annular detonation chamber, wherein at least a portion of said fuel is circulated through said circuit before the injection thereof into said chamber.

6. The turbomachine according to claim 5, wherein said at least one circuit for cooling extends along at least one lateral wall of said at least one annular detonation chambers, over at least part of the length threrof.

7. The turbomaehine according to claim 1 wherein said turbomachine is of a single flow type, comprising a single flow (E), wherein said incoming air flow comprises said single flow (E).

8. The turbomachine according to claim 1 wherein said turbomachine is of the double flow type, comprising a primary flow and a secondary flow, wherein said incoming air flow comprises said primary flow.

9. A flying vehicle. wherein said vehicle is fitted with at least one turbomachine (1) as specified in claim 1.

10. A power generation system, wherein said system is fitted with at least one turbomachine (1) as specified in claim 1.

11. The ttirbomachine according to claim 1, wherein said at least one annular detonation chamber comprises a plurality of annular detonation chambers arranged in a concentric manner in relation to each other, relative to an axis (2) of the turbomachine (1).

* * * * *